United States Patent [19]

Suganuma

[11] Patent Number: 5,736,080
[45] Date of Patent: Apr. 7, 1998

[54] PROGRAM SETTING METHOD FOR INJECTION MOLDING MACHINE CONTROL DEVICE

[75] Inventor: Masashi Suganuma, Nagano, Japan

[73] Assignee: Nissei Plastic Industrial Co., Ltd., Nagano-Ken, Japan

[21] Appl. No.: 653,350

[22] Filed: May 24, 1996

[30] Foreign Application Priority Data

May 26, 1995 [JP] Japan .................................. 7-152287

[51] Int. Cl.[6] .................................................. B29C 45/76
[52] U.S. Cl. .................... 264/40.3; 264/40.6; 264/40.7; 425/143; 425/144; 425/145; 425/149
[58] Field of Search .................................. 425/145, 143, 425/144, 149; 264/40.3, 40.6, 40.7

[56] References Cited

U.S. PATENT DOCUMENTS

| 5,198,240 | 3/1993 | Baxi | 425/145 |
| 5,223,191 | 6/1993 | Tatsuno et al. | 425/145 |
| 5,326,246 | 7/1994 | Usui et al. | 425/145 |
| 5,425,906 | 6/1995 | Hashimoto | 425/145 |

FOREIGN PATENT DOCUMENTS

| 3-207620 | 9/1991 | Japan . |
| 5-12136 | 2/1993 | Japan . |

*Primary Examiner*—Tim Heitbrink
*Attorney, Agent, or Firm*—Birch, Stewart, Kolasch & Birch, LLP

[57] ABSTRACT

A program setting method for an injection molding machine control device comprises the steps of a manufacturer previously making and storing unit programs corresponding to a plurality of basic operations, a user selecting desired unit programs to form whole programs and the control device connecting the selected unit programs in a predetermined order before storing the whole programs. By this method, users can readily and simply make and store a desired sequence program for the injection molding machine.

20 Claims, 5 Drawing Sheets

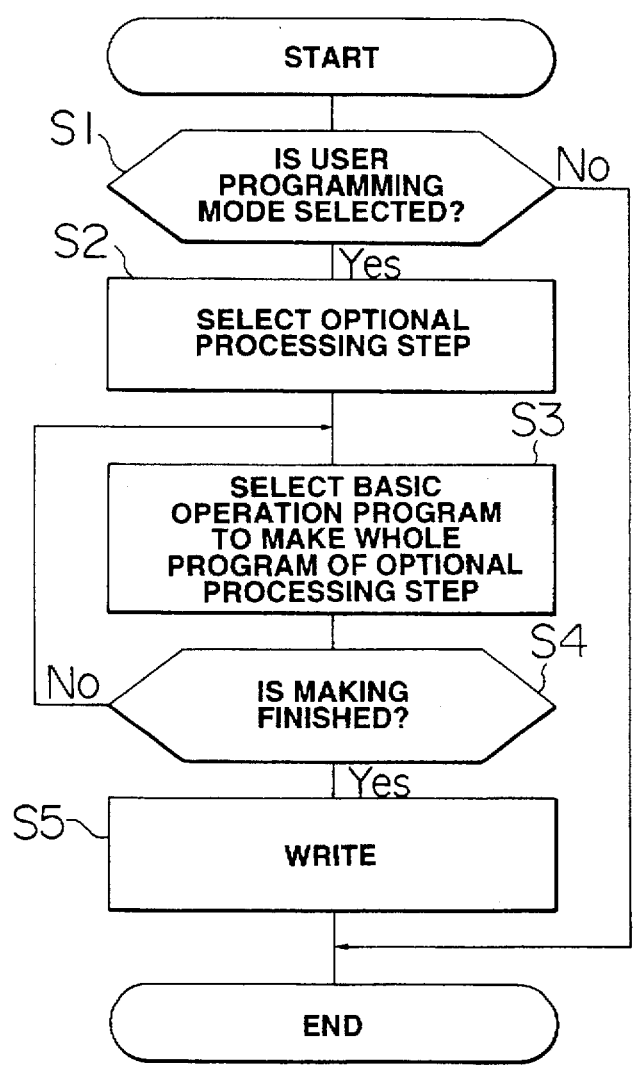

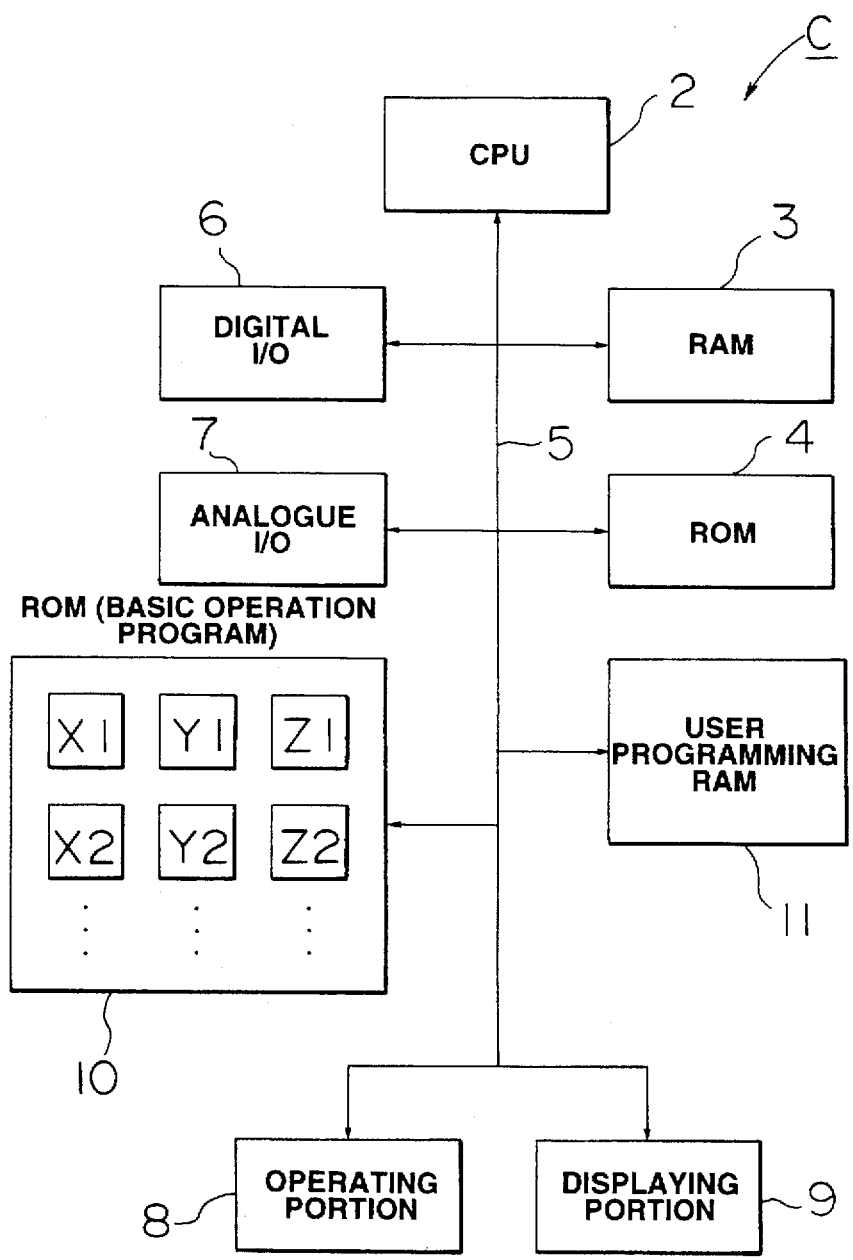

FIG.3
(AUTOMATICALLY PURGING PROCESS)

|  | CONTENT OF BASIC OPERATION PROGRAM |
|---|---|
| X 1 | INJECTION DEVICE ADVANCING |
| X 2 | INJECTION DEVICE RETREATING |
| X 3 | MEASURING (NON-BACK PRESSURE) |
| X 4 | MEASURING (BACK PRESSURE) |
| X 5 | INJECTING (THE MOST ADVANCING) |
| X 6 | INJECTING (THE MOST ADVANCING POSITION VARIABLE) |
| X 7 | BEFORE-MEASUREMENT SCREW FORCIBLY RETREATING (TIME) |
| X 8 | BEFORE-MEASUREMENT SCREW FORCIBLY RETREATING (POSITION) |

FIG.4a 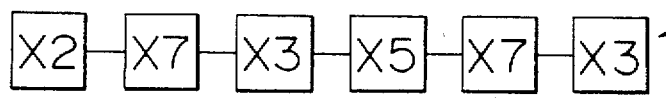

FIG.4b 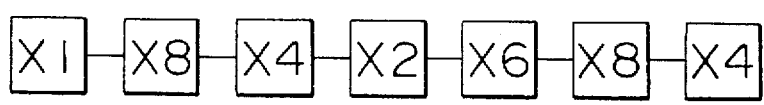

FIG.4c 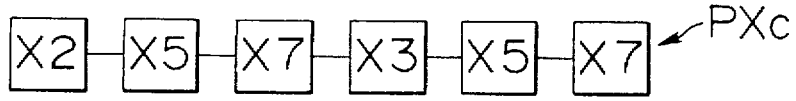

FIG.5
(PRODUCTION-COMPLETION-TIME STOPPING PROCESS)

| | CONTENT OF BASIC OPERATION PROGRAM |
|---|---|
| Y1 | MOLD OPENING-STOPPING |
| Y2 | MOLD CLAMPING-STOPPING |
| Y3 | INJECTION DEVICE RETREATING |
| Y4 | INJECTING |
| Y5 | EJECTOR |
| Y6 | NOZZLE/INJECTION BARREL TEMPERATURE MAINTAINING CONTROL |
| Y7 | PUMP STOPPING |
| Y8 | ALARM LAMP |
| Y9 | ALARM BUZZER |

FIG.7

(ABNORMAL-TIME STOPPING PROCESS)

|  | CONTENT OF BASIC OPERATION PROGRAM |
|---|---|
| Z1 | MOLD OPENING-STOPPING |
| Z2 | MOLD CLAMPING-STOPPING |
| Z3 | INJECTION DEVICE RETREATING |
| Z4 | INJECTING |
| Z5 | EJECTOR |
| Z6 | NOZZLE/INJECTION BARREL TEMPERATURE MAINTAINING CONTROL |
| Z7 | PUMP STOPPING |
| Z8 | ALARM LAMP |
| Z9 | ALARM BUZZER |

PROGRAM SETTING METHOD FOR INJECTION MOLDING MACHINE CONTROL DEVICE

BACKGROUND OF THE INVENTION

1. Field of the Invention

The invention relates to a program setting method for an injection molding machine control device, wherein the control device operates on a sequence program.

2. Description-of the Relevant Art

Conventionally, an injection molding machine has a control device built-in, which sequentially carries out various controls for the injection molding machine, as disclosed in the gazettes of Japanese Patent Application Laid Open (Kokai) No. 3(1991)-207628, and of Japanese Patent Publication (Kokoku) No. 5(1993)-12136.

The control device includes a micro processor unit (MPU) comprised of a sequence portion for executing sequence controls, and a human machine interface (HMI) portion having the functions of setting parameters required for executing the sequence controls, and monitoring and displaying the condition of the machine, etc. This MPU is operated by the sequence program stored in a ROM (read only memory). Commonly, injection molding machines are made to operate in an automatic mode, even machines used to make many different products or small numbers of products. In the machines which are constantly being used to mold different product and wherein relatively few products are molded before a different product is to be molded, the ratio of the time spent changing the automatic control programming to the time spent molding is quite high. For example, when changing the color of the molded product while using the same mold much time is spent replacing the molding materials while repeating the steps of purging the molding material of one color and supplying the new molding material of another color. Moreover, in this Case, usually the purging step is carried out automatically in order to shorten the arranging time.

Further, the conventional automatic purging step is carried out by a predetermined sequence program which is programmed by the machine's manufacturer. There is no means by which knowledgeable users (molded product manufacturers) can tailor the operations of the injection molding machine to their specific production needs. Moreover, although the users can ask the machine manufacturers to change the program, it takes a long time to change the program, and there are costs required for the labor and the programming, and also the use of the machine is lost while changing the program.

SUMMARY OF THE INVENTION

It is an object of the invention to provide a program setting method for an injection molding machine control device, which is capable of allowing users to readily make a desired sequence program using only the know-how they possess.

In order to attain the above-mentioned object, there is proposed a program setting method for an injection molding machine control device comprising the steps of a manufacturer previously making and storing, unit programs X1, X2 . . . , Y1, Y2 . . . , Z1, Z2 . . . corresponding to a plurality of basic operations a user, selecting unit programs X1 . . . , Y1 . . . , Z1 . . . to form whole programs, and the control device connecting the selected unit programs X1 . . . , Y1 . . . , Z1 . . . in a predetermined order before storing the whole programs PXa, PXb . . . , PYa, PYb . . . , PZa, PZb . . . .

The unit programs X1 . . . , Y1 . . . , Z1 . . . correspond to a plurality of basic operations of an processing step. The unit programs are previously made by a manufacturer and stored in a ROM 10 built-in a control device C. The optional processing step is a step in addition to a standard step, or an injecting step relating to the molding, such as a pressure maintaining step and a measuring step, etc. The optional processing steps include one or two and more of: an automatically purging process, a production-completion-time stopping process, an abnormal-time stopping process, and an abnormal-time ejector process.

In the invention, the users can make and store whole programs PXa, PXb . . . , PYa, PYb . . . , PZa, PZb . . . of the optional processing steps based on the unit programs X1 . . . , Y1 . . . , Z1 . . . . At the time of forming the whole program, the respective unit programs X1 . . . , Y1 . . . , Z1 . . . stored in the ROM 10, are displayed on the displaying portion 9, and are optionally selected according to the setting guidance, then the selected unit programs X1 . . . , Y1 . . . , Z1 . . . are connected in the predetermined order, so that the whole programs PXa . . . , PYa . . . , PZa . . . of the optional processing step are made. The whole programs PXa . . . , PYa . . . , PZa . . . are stored in another ROM 4 of the control device C and can be used for the actual control. Moreover, the stored whole programs PXa . . . , PYa . . . , PZa . . . can be rewritten when desired.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a flowchart showing a procedure of a program setting method according to the invention;

FIG. 2 is a block diagram of a control device which can carry out the setting method;

FIG. 3 is a table showing unit programs which are used in the setting method;

FIGS. 4a to 4c are block diagrams showing whole programs which are made by the setting method;

FIG. 5 is a table showing other unit programs which are used in the setting method;

FIG. 7 is a table of still other unit programs used in the setting method; and

DETAILED DESCRIPTION OF THE PREFERRED EMBODIMENTS

Figure 6A:
FIGS. 6a to d are block diagrams showing other whole programs which are made by the setting method.

One preferable embodiment according to the invention will be exemplified and described hereinafter with reference to the drawings.

At first, the construction of a main part (including an MPU) of an injection molding machine control device C which can carry out a program setting method according to the invention will be described with reference to FIG. 2.

In FIG. 2, reference numeral 2 denotes a CPU which executes various kinds of controls and a calculating process. Reference numeral 3 denotes a RAM, and 4 a ROM which uses a rewritable EEPROM, etc., each of which is managed by the CPU 2. Moreover, the CPU 2, the RAM 3 and the ROM 4 are connected to a bus line 5. Reference numeral 6 denotes an input/output portion of digital signals, and 7 an input/output portion of analogue signals, each of which is connected to the bus line 5. Also, reference numeral 8 denotes an operating portion which is comprised of a key board, etc., and 9 a displaying portion which is comprised of a CRT, etc., respectively.

Reference numeral 10 denotes a ROM which stores unit programs X1, X2 . . . , Y1, Y2 . . . , Z1, Z2 . . . corresponding to a plurality of basic operations of an optional processing step which can be annexed to a standard step relating to the molding. The ROM 10 is connected to the bus line 5. An optional processing step means a step which is not directly related to molding, such as an automatically purging process, a production-completion-time stopping process, an abnormal-time stopping process, and an abnormal-time ejector process, etc. A standard step is an injecting step directly relating to molding, such as a pressure maintaining step, a measuring step, a cooling step, a mold opening/closing step, etc. A basic operation is a small operation which is a part of an operational processing step. For example, in the case of the automatic purging process, the basic operations include an: "injection device advancing" operation, "injection device retreating" operation, "measuring (non-back pressure)" operation, "measuring (back pressure)" operation, "injecting (the most advancing)" operation, "injecting (the most advancing position variable" operation, "before-measuring screw forcibly retreating (time)" operation, and "before-measuring screw forcibly retreating (position)" operation.

Further, reference numeral 11 denotes a user programmable RAM which is used at the time of storing the program, and which is connected to the bus line 5. A normal RAM can be used for the user programmable RAM 11.

Next, the program setting method according to the invention will be described with reference to the flowchart shown in FIG. 1.

At first, the machine manufacturers make the unit programs for the respective optional processing steps, that is, the unit programs used the in "automatically purging process" shown in FIG. 3, comprised of X1 "injection device advancing", X2 "injection device retreating", X3 "measuring (non-back pressure)", X4 "measuring (back pressure)", X5 "injecting (the most advancing)", X6 "injecting (the most advancing position variable)", X7 "before-measurement screw forcibly retreating (time)", X8 "before-measurement screw forcibly retreating (position)", the unit programs used in the "production-completion-time stopping process" shown in FIG. 5, comprised of Y1 "mold opening-stopping", Y2 "mold clamping-stopping", Y3 "injection device retreating", Y4 "injecting", Y5 "ejector", Y6 "nozzle/injection barrel temperature maintaining control", Y7 "pump stopping", Y8 "alarm lamp", Y9 "alarm buzzer", and the unit programs used in the "abnormal-time stopping process" shown in FIG. 7, comprised of Z1 "mold opening-stopping", Z2 "mold clamping-stopping", Z3 "injection device retreating", Z4 "injecting", Z5 "ejector", Z6 "nozzle/injection barrel temperature maintaining control", Z7 "pump. stopping", Z8 "alarm lamp", Z9 "alarm buzzer". Then, the manufacturers store the unit programs in the ROM 10.

The users can set the whole programs PXa, PXb . . . , PYa, PYb . . . , PZa, PZb . . . of the optional processing step based on the unit programs X1 . . . , Y1 . . . , Z1 . . . .

That is, when the users set the programs, first, a user programming mode is selected at a step S1. Whereby, the whole program of the operational processing step can be set. Next, the optional processing step to be set is selected at a step S2. At this point, alternatives of the optional processing step are displayed in the display portion 9, i.e. "automatically purging process", "production-completion-time stopping processing", and "abnormal-time stopping process", and are selected. As one example, it is assumed that the "automatically purging process" is selected. Next, the unit programs X1 to X8 in the "automatically purging process", as shown in FIG. 3, are displayed on the displaying portion 9, so that desired ones may be selected from the respective unit programs X1 to X8 according to the setting guidance which is displayed on the displaying portion 9.

For example, in the automatic purging process, "X2", "X7", "X3", "X5", "X7", "X3" may be selected in the order as shown in FIG. 4a, and the program may be set to repeat the automatic purging process of retreating the injection device, and retreating the screw forcibly during a predetermined time before measuring, then carrying out the measurement at a non-back pressure, thereafter, moving the screw up to the most advancing position, thereby carrying out the injection. By this selection, there is made a whole program PXa of the "automatically purging process" in which the unit programs are connected in the selected order, at a step S3. In forming the whole program, the respective unit programs are read out from the ROM 10, and transferred to the RAM 11 to be written in an empty area of the RAM 11. It is determined whether the whole program PXa is finished at a step S4, by a user pressing an end key on the operating portion 8. The finished whole program PXa is then transferred from the RAM 11 to the ROM 4, then written in the ROM 4 at a step S5. As mentioned above, the users can make and set the desired whole program PXa corresponding to the automatically purging process. Further, the whole program PXa can be made again and rewritten as occasion demands.

Figure 6B:
Figure 6C:
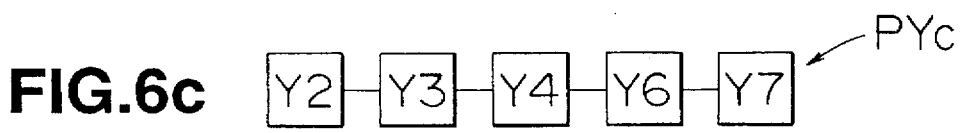
Figure 6D:
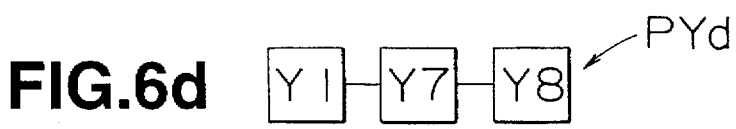
Figure 8A:
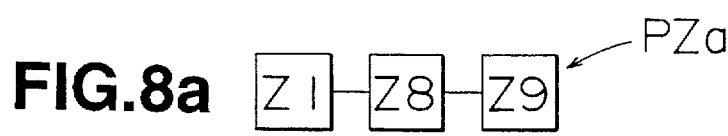
FIGS. 8a to 8d are block diagrams showing still other whole programs which are made by the setting method.
Figure 8B:
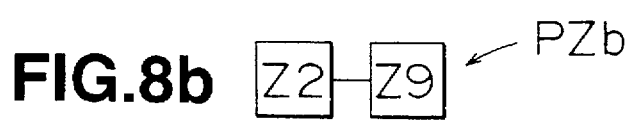
Figure 8C:
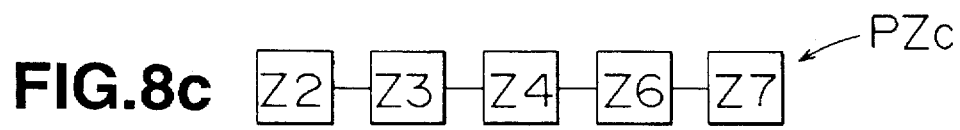
Figure 8D:
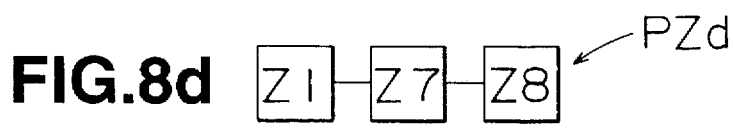

As further illustration, FIG. 4b shows a program PXb in which the unit programs "Xi", "X8", "X4", "X2", "X6", "X8", and "X4" are connected in order, and in FIG. 4c shows a whole program PXc in which the unit programs "X2", "X5", "X7", "X3", "X5", and "X7" are connected in order. FIG. 6a shows a whole program PYa in which the unit program "Y1" in the "production-completion-time stopping process" is selected. FIG. 6b shows a PYb in which the unit program "Y2" is selected. FIG. 6c shows a whole program PYc in which the unit programs "Y2", "Y3", "Y4", "Y6", and "Y7" are connected in order. FIG. 6d shows a whole program PYd in which the unit programs "Y1", "Y7", "Y8" are connected in order. Furthermore, FIG. 8a shows a whole program PZa in which the unit programs "Z1", "Z8", and "Z9" in the "abnormal-time stopping process" are connected in order. FIG. 8b shows a whole program PZb in which the unit programs "Z2" and "Z9" are connected in order. FIG. 8c shows a whole program PZc in which the unit programs "Z2", "Z3", "Z4", "Z6" and "Z7" are connected in order. FIG. 8d shows a whole program PZd in which the unit programs "Z1", "Z7" and "Z8" are connected in order.

Such whole programs, as illustrated in FIGS. 4b, 4c, 6a–6d, and 8a–8d, are also made and stored in a similar manner to the case of the above-mentioned whole program PXa. Each whole program may be made again or rewritten as occasion demands. By virtue of the invention, users can readily make and store sequence programs using only the know-how they possess.

It should be readily apparent that other optional processing steps, or whole programs, besides those specifically disclosed, may be used, such as an abnormal time ejector process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiment of the invention is described in detail. However, the invention is not restricted to the embodiment. For example, the optional processing step, except the exemplified examples, includes another any optional processing step such as an abnormal-time ejector process. Otherwise, the detailed construction and the method, etc., can be optionally modified so long as they are not deviated from the gist of the invention.

What is claimed is:

1. A method of operating a molding machine, the molding machine including a display, a user input device, a control unit, and a memory; wherein the control unit controls various aspects of the molding machine; the memory has free space and also stores a plurality of unit programs; each unit program has a respective label; and each unit program is made up of basic operations useable by the control unit to control an aspect of the molding machine, the method comprising the steps of:

displaying, on the display, a plurality of the respective labels for the plurality of unit programs;

accepting a user's selection, via the user input device, of one or more of the respective labels;

assembling the basic operations of the unit programs associated with the selected labels in a predetermined order to form a whole program;

storing the whole program in the free space of the memory;

running the control unit using the whole program stored in the memory; and operating the molding machine under the control of the control unit.

2. The method of claim 1, wherein each unit program stored in the memory was stored there by a manufacturer of the molding machine.

3. The method of claim 1, further including the step of determining the predetermined order by using the control unit.

4. The method of claim 3, further including again performing said displaying, accepting, assembling, storing, running, and operating steps in order to rewrite the whole program.

5. The method of claim 1, further including again performing said displaying, accepting, assembling, storing, running, and operating steps in order to rewrite the whole program.

6. The method of claim 1, wherein the whole program includes basic operations for performing an automatic purging process in the molding machine.

7. The method of claim 6, wherein the basic operations include: an injection device advancing operation; an injection device retreating operation; a non-back pressure-measuring operation; a back pressure-measuring operation; an advancing injecting operation; an advancing position variable-injecting operation; a before-measurement screw forcibly retreating, time; and a before-measurement screw forcible retreating position.

8. The method of claim 1, wherein the whole program includes basic operations for performing a production-completion-time stopping process.

9. The method of claim 8, wherein the basic operations include: a mold opening-stopping operation, a mold clamping-stopping operation, an injection device retreating operation, an injecting operation, an ejector operation, a nozzle/injection barrel temperature maintaining control operation, a pump stopping operation, an alarm lamp operation, and an alarm buzzer operation.

10. The method of claim 1, wherein the whole program includes basic operations for performing an abnormal-time stopping process.

11. The method of claim 10, wherein the basic operations include: a mold opening-stopping operation, a mold clamping-stopping operation, an injection device retreating operation, an injection operation, an ejector operation, a nozzle/injection barrel temperature maintaining control operation, a pump stopping operation, and alarm lamp operation, and an alarm buzzer operation.

12. The method of claim 1, wherein the whole program includes basic operations for performing an abnormal-time ejector process.

13. The method of claim 1, wherein said accepting step is completed and said assembling step begins when the user inputs an indication, via the user input device, that the selections are completed.

14. The method of claim 13, further including the step of determining the predetermined order by using the control unit.

15. The method of claim 1, wherein the memory includes a ROM.

16. The method of claim 1, wherein the memory includes an EEPROM and the EEPROM is a portion of the control unit.

17. The method of claim 1, wherein the memory includes a first ROM and a second ROM, the first ROM storing the plurality of unit programs, and the second ROM having the free space for storing the whole program.

18. The method of claim 17, wherein said memory further includes a RAM, the method further including the steps of:

performing said assembling step in the RAM, and performing said storing step in the second ROM.

19. The method of claim 18, further including again performing said displaying, accepting, assembling, storing, running, and operating steps in order to rewrite the whole program.

20. The method of claim 18, further including the step of determining the predetermined order by using the control unit.

* * * * *